(12) United States Patent
Merino Lopez et al.

(10) Patent No.: US 12,728,672 B2
(45) Date of Patent: Sep. 8, 2026

(54) TREAD FOR A TIRE

(71) Applicant: COMPAGNIE GENERALE DES ETABLISSEMENTS MICHELIN, Clermont-Ferrand (FR)

(72) Inventors: Jose Merino Lopez, Clermont-Ferrand (FR); Jose Carlos Araujo Da Silva, Clermont-Ferrand (FR); Aurore Crochet, Clermont-Ferrand (FR); Guillaume Hennebert, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 596 days.

(21) Appl. No.: 17/416,620

(22) PCT Filed: Dec. 17, 2019

(86) PCT No.: PCT/FR2019/053123
§ 371 (c)(1),
(2) Date: Jun. 21, 2021

(87) PCT Pub. No.: WO2020/128305
PCT Pub. Date: Jun. 25, 2020

(65) Prior Publication Data

US 2022/0072903 A1 Mar. 10, 2022

(30) Foreign Application Priority Data

Dec. 21, 2018 (FR) ...................................... 1873875

(51) Int. Cl.
*B60C 1/00* (2006.01)
*B60C 11/00* (2006.01)
(Continued)

(52) U.S. Cl.
CPC ........ *B60C 1/0016* (2013.01); *B60C 11/0008* (2013.01); *B60C 11/005* (2013.01);
(Continued)

(58) Field of Classification Search
CPC ... B60C 11/0008; B60C 11/005; B60C 1/006; B60C 1/0016; B60C 11/24; C08F 4/61927; C08F 210/02; C08F 236/06; C08L 23/083
See application file for complete search history.

(56) References Cited

U.S. PATENT DOCUMENTS 4,580,608 A 4/1986 Rampl
6,336,486 B1 1/2002 Iwasaki et al.
(Continued)

FOREIGN PATENT DOCUMENTS

CN 104936793 A 9/2015
CN 105358338 A 2/2016
(Continued)

OTHER PUBLICATIONS

FR 3063732A1 Machine Translation (Year: 2018).*
(Continued)

*Primary Examiner* — Justin R Fischer
*Assistant Examiner* — Wendy L Boss
(74) *Attorney, Agent, or Firm* — VENABLE LLP

(57) ABSTRACT

A tire having a rubber tread comprises a first radially inner layer C1 and a second radially outer layer C2, the first and second layers being intended to be in contact with a ground on which they are running, in new or worn condition, in which the rubber composition of the first layer C1 comprises more than 50 phr of a copolymer of ethylene and of a 1,3-diene, a reinforcing filler and a plasticizing system, the 1,3-diene being 1,3-butadiene or isoprene and the ethylene
(Continued)

units in the copolymer representing more than 50 mol % of all the monomer units of the copolymer.

13 Claims, 1 Drawing Sheet

(51) Int. Cl.
*C08K 3/36* (2006.01)
*C08L 23/0807* (2025.01)
*C08L 91/00* (2006.01)

(52) U.S. Cl.
CPC .............. *C08K 3/36* (2013.01); *C08L 23/083* (2013.01); *B60C 2011/0025* (2013.01); *C08L 91/00* (2013.01)

(56) References Cited

U.S. PATENT DOCUMENTS 6,569,799 B1 5/2003 Barbotin et al.
6,800,705 B2 10/2004 Barbotin et al.
7,094,854 B2 8/2006 Monteil et al.
7,199,175 B2 4/2007 Vasseur
7,217,751 B2 5/2007 Durel et al.
7,250,463 B2 7/2007 Durel et al.
7,300,970 B2 11/2007 Durel et al.
7,491,767 B2 2/2009 Durel et al.
7,900,667 B2 3/2011 Vasseur
8,071,700 B2 12/2011 Thuilliez et al.
8,071,800 B2 12/2011 Thuilliez et al.
8,268,949 B2 9/2012 Thuilliez et al.
8,492,573 B2 7/2013 Thuilliez et al.
8,962,743 B2 2/2015 Kaita et al.
8,962,744 B2 2/2015 Horikawa et al.
9,156,968 B2 10/2015 Simon et al.
10,189,313 B2 1/2019 Schaffhauser et al.
10,189,978 B2 1/2019 Thuilliez et al.
10,202,005 B2 2/2019 Shimizu et al.
10,752,712 B2 8/2020 Lafaquiere et al.
10,934,377 B2 3/2021 Lafaquiere et al.
11,155,656 B2 10/2021 Thuilliez et al.
11,241,370 B2 2/2022 Valero et al.
11,286,369 B2 3/2022 Gornard et al.
2003/0004287 A1 1/2003 Barbotin et al.
2003/0212185 A1 11/2003 Vasseur
2004/0118495 A1 6/2004 Sandstrom et al.
2004/0132880 A1 7/2004 Durel et al.
2005/0004297 A1 1/2005 Durel et al.
2005/0016650 A1 1/2005 Durel et al.
2005/0016651 A1 1/2005 Durel et al.
2005/0032965 A1 2/2005 Valero
2005/0239639 A1 10/2005 Monteil et al.
2007/0112120 A1 5/2007 Vasseur
2009/0182104 A1 7/2009 Thuilliez et al.
2010/0018618 A1* 1/2010 Moorhead ............... B60C 11/00 152/209.1
2010/0022725 A1 1/2010 Thuilliez et al.
2010/0221541 A1 9/2010 Valero et al.
2011/0048605 A1* 3/2011 Zhang .................. B60C 1/0016 152/525
2011/0263784 A1 10/2011 Valero et al.
2012/0142905 A1 6/2012 Thuilliez et al.
2012/0165492 A1 6/2012 Thuilliez et al.
2013/0210994 A1 8/2013 Kaita et al.
2013/0296471 A1* 11/2013 Lesage .................. B60C 1/0016 524/502
2013/0296475 A1 11/2013 Simon et al.
2013/0324660 A1 12/2013 Matsushita et al.
2014/0018493 A1 1/2014 Horikawa et al.
2014/0350138 A1 11/2014 Cladiere et al.
2015/0047762 A1 2/2015 Shimizu et al.
2015/0239296 A1* 8/2015 Fukuda ............... B60C 11/0041 152/209.5
2015/0353716 A1 12/2015 Thuilliez et al.
2016/0312014 A1 10/2016 Lemerle et al.
2016/0375727 A1 12/2016 Schaffhauser et al.
2017/0327617 A1 11/2017 Araujo Da Silva et al.
2018/0186189 A1 7/2018 Pallot et al.
2018/0312003 A1* 11/2018 Winston .................. C08K 3/36
2018/0326790 A1 11/2018 Joulin et al.
2018/0355083 A1 12/2018 Lafaquiere et al.
2019/0233566 A1 8/2019 Lafaquiere et al.
2019/0263954 A1 8/2019 Lafaquiere et al.
2020/0140587 A1 5/2020 Thuilliez et al.
2021/0079135 A1 3/2021 Thuilliez et al.
2021/0130578 A1* 5/2021 Gornard .................. C08K 5/14
2021/0130593 A1 5/2021 Araujo Da Silva et al.
2022/0073713 A1 3/2022 Merino Lopez et al.

FOREIGN PATENT DOCUMENTS

CN 107000395 A 8/2017
EP 0242755 A2 10/1987
EP 0869016 A2 10/1998
EP 1092731 A1 4/2001
EP 2594413 A1 5/2013
EP 2599805 A1 6/2013
FR 3029139 A1 6/2016
FR 3044008 A1 5/2017
FR 3063732 A1 * 9/2018 .............. B60C 1/00
FR 3065005 A1 10/2018
JP 2006-160932 A 6/2006
JP 2012-131965 A 7/2012
JP 2012-162630 A 8/2012
JP 2013-185048 A 9/2013
JP 2014-136562 A 7/2014
JP 2016-505697 A 2/2016
JP 2018-537340 A 12/2018
WO 02/10269 A2 2/2002
WO 02/083782 A1 10/2002
WO 03/002648 A1 1/2003
WO 03/002649 A1 1/2003
WO 03/016215 A1 2/2003
WO 03/016387 A1 2/2003
WO 2004/035639 A1 4/2004
WO 2007/054223 A2 5/2007
WO 2007/054224 A2 5/2007
WO 2012/084599 A1 6/2012
WO 2013/140999 A1 9/2013
WO 2014/114607 A1 7/2014
WO WO-2016087078 A1 * 6/2016 ........... B60C 11/005
WO 2016/202702 A1 12/2016
WO 2017/074410 A1 5/2017
WO 2017/093654 A1 6/2017
WO 2018/020122 A1 2/2018
WO 2018/020123 A1 2/2018
WO 2018/224774 A1 12/2018
WO 2018/224776 A1 12/2018

OTHER PUBLICATIONS

WO 2016087078A1 Machine Translation (Year: 2016).*
R. Mildenberg, et al., Hydrocarbon Resins, VCH, New York, chapter 5, pp. 141-146 (1997).
Copending U.S. Appl. No. 17/786,340, filed Dec. 9, 2020 (available on USPTO system).
Copending U.S. Appl. No. 17/786,348, filed Dec. 9, 2020 (available on USPTO system).
International Search Report dated Mar. 6, 2020, in corresponding PCT/FR2019/053123 (5 pages).
S. Brunauer, et al., "Adsorption of Gases in Multimolecular Layers," J. Am. Chem. Soc., vol. 60, pp. 309-319 (1938).

* cited by examiner

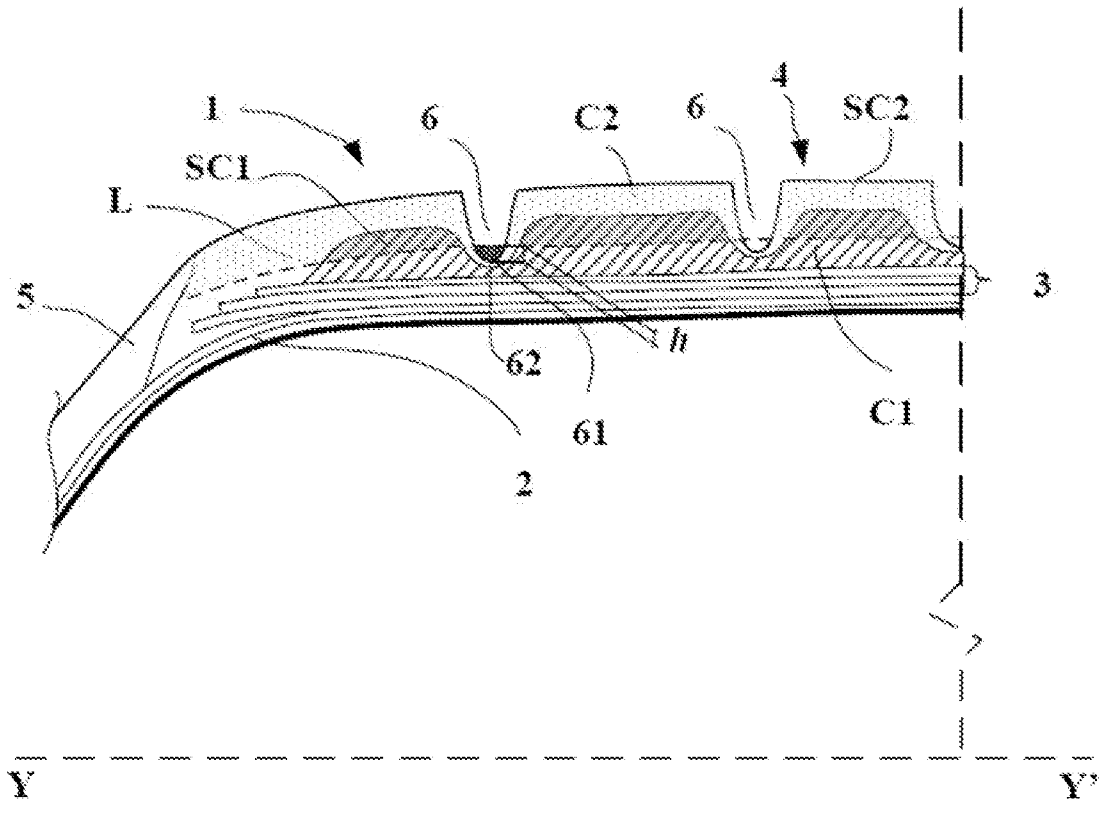
1
6
C2
6
4
SC2
SC1
L
5
3
h
62
61
C1
2
Y
Y'

TREAD FOR A TIRE

FIELD OF THE INVENTION

The subject of the present invention is a vehicle tyre and, in particular, the tread of a vehicle tyre.

PRIOR ART

Since a tyre has a geometry exhibiting symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. The expressions "radially", "axially" and "circumferentially" mean "in the radial direction", "in the axial direction" and "in the circumferential direction", respectively.

"Radially inner" and "radially outer" mean "closer to" and "further away from the axis of rotation of the tyre", respectively. "Axially inner" and respectively "axially outer" mean "closer to" and respectively "further away from the equatorial plane of the tyre", the equatorial plane of the tyre being the plane passing through the middle of the tread surface of the tyre and perpendicular to the axis of rotation of the tyre.

The tread is the part of the tyre intended to come into contact with the ground via a tread surface, and extending radially from a bottom surface to the tread surface, axially from a first tread edge to a second tread edge defining the axial width of the tread, and circumferentially over the whole periphery of the tyre. The tread, regardless of whether the tyre is intended to be fitted on a passenger vehicle or a heavy-duty vehicle, is provided with a tread pattern comprising, notably, tread pattern elements or elementary blocks delimited by various main, longitudinal or circumferential, transverse or oblique grooves, the elementary blocks also being able to have various finer slits or sipes. The grooves form channels for draining off water when running on wet ground.

Radially inside the tread, a radial-type tyre comprises a reinforcement, consisting of a crown reinforcement and a radial carcass reinforcement radially inside the crown reinforcement. The crown reinforcement comprises at least one crown layer consisting of reinforcing elements or reinforcers coated with a rubber mixture and parallel to one another. The radial carcass reinforcement comprises at least one carcass layer consisting of reinforcers coated with an rubber mixture, parallel to one another and oriented substantially radially, that is to say forming, with the circumferential direction, an angle of between 85° and 95°.

The rubber compositions of tyre treads are specialized for performance in terms of contact with a ground on which they are running, this being up to the regulatory wear of the tyres. The tread of a tyre is responsible for a large part of the rolling resistance of that tyre. This contribution is of course very variable depending on the design of the tyre, but an order of magnitude of about 50% can be achieved.

It is usual to adjust the materials closest to the plies of the crown reinforcement of the tyre, in order, among other things, to minimize rolling resistance, for example with the introduction of a weakly hysteretic underlayer. It should be noted that an underlayer does not come into contact with the ground on which it is running, in the course of the regulatory life of the tyre.

It is also possible to further specialize the materials of the tread. There can be two different kinds of rubber compositions in the thickness of the tread. Document EP0869016 A2 presents such a tread with a first radially inner layer and a second radially outer layer, such that, during the wear of the tread, the first radially inner layer gradually comes increasingly into contact with the ground on which it is running. In this example, the rubber composition of the first layer has a grip performance greater than that of the second layer.

The performance compromise between rolling resistance and wear resistance of treads has been able to be improved by the introduction into a rubber composition of a copolymer of ethylene and of 1,3-butadiene containing more then 50 mol % of ethylene units. Reference may be made, for example, to patent application WO 2014114607 A1. However, such a composition does not make it possible to give the tread optimum grip performance, in particular for a passenger vehicle.

It is known that the grip performance of a tyre can be improved by increasing the contact surface of the tread on the ground on which it is running. One solution consists in using a highly deformable tread, in particular a highly deformable rubber composition which constitutes the surface of the tread intended to come into contact with the running surface. The use of a very soft rubber composition, which is nevertheless favourable for grip, can lead to a deterioration in the roadholding of the tyre.

It is known that a greater stiffness of the tread is desirable for improving roadholding, it being possible for this stiffening of the tread to be obtained for example by increasing the content of reinforcing filler or by incorporating certain reinforcing resins into the constituent rubber compositions of these treads. However, generally, these solutions are not always satisfactory, because they can be accompanied by a degradation of the rolling resistance.

To meet these two contradictory requirements, which are roadholding and grip, one solution also consists in creating a stiffness gradient by a phenomenon of accommodation of the rubber composition of the tread as described in the patent applications WO 02/10269 and WO 2012084599. This accommodation phenomenon results in the ability of the rubber composition to become less stiff at the surface of the tread under the effect of the deformations undergone by the tread during the rolling of the tyre. This decrease in stiffness at the surface of the tread does not occur or occurs very little inside the tread, which thus maintains a higher level of stiffness than the surface of the tread.

These technical solutions for improving the grip performance, roadholding performance and rolling resistance performance have generally been described for highly unsaturated diene elastomers which are characterized by a molar content of diene much greater than 50%.

A rubber composition comprising a copolymer of ethylene and of 1,3-butadiene, the processability of which is improved by the introduction of 5 to 10 phr of a plasticizing resin, is described in patent application JP 2013-185048. Not only is the molar content of ethylene in the copolymer much less than 50%, but the grip performance is also not addressed.

For the use of conjugated diene copolymers containing molar contents of ethylene greater than 50% in rubber compositions for tyre treads, there is therefore an interest and a need to also improve the grip performance of the tread.

Continuing its efforts, the Applicant has discovered that the combined use of a highly saturated diene elastomer and a specific plasticizing system in a rubber composition for a tyre tread makes it possible to improve the grip performance of the tyre. Particular embodiments of the invention even help to improve the performance compromise between grip and rolling resistance. Other particular embodiments of the invention also make it possible to improve the performance compromise between grip and roadholding.

SUMMARY OF THE INVENTION

A subject of the invention is a tyre having an axis of rotation and comprising a crown extended by two sidewalls and two beads, a carcass reinforcement anchored in the two beads, a crown reinforcement and a rubber tread radially outside said crown reinforcement, the tread comprising a first radially inner layer C1 and a second radially outer layer C2, the first and second layers being intended to be in contact with a ground on which they are running, in new or worn condition. This tyre is characterized in that the rubber composition of the first layer C1 comprises more than 50 phr of a copolymer of ethylene and of a 1,3-diene, a reinforcing filler and a plasticizing system, the 1,3-diene being 1,3-butadiene or isoprene and the ethylene units in the copolymer representing more than 50 mol % of all the monomer units of the copolymer.

A content by weight or content of the copolymer of ethylene and of a 1,3-diene of layer C1 greater than 50 phr means that this copolymer of ethylene and of a 1,3-diene is the majority elastomer in the rubber composition of the first layer C1 of the tread. This majority content of copolymer of ethylene and of a 1,3-diene contributes to obtaining good roadholding of the tyre. It can also contribute to improving the rolling resistance performance of the tyre.

According to a first alternative form of the invention, the rubber composition of the layer C1 comprises a second elastomer, preferably a diene elastomer, that is to say an elastomer comprising diene monomer units. According to any one of the embodiments of the first alternative form of the invention, the content of the second elastomer is preferably less than 30 phr and very preferentially less than 10 phr.

The second elastomer can be a highly unsaturated diene elastomer selected from the group consisting of polybutadienes, polyisoprenes, butadiene copolymers, isoprene copolymers and mixtures of these elastomers.

According to a second alternative form of the invention, the copolymer of ethylene and of a 1,3-diene is the only elastomer of the rubber composition of the first layer C1.

According to one alternative implementation form of the tyre according to the invention, the rubber composition of the second layer C2 comprises less than 50 phr of a copolymer of ethylene and of a 1,3-diene.

Preferentially, the ratio K between the dynamic shear modulus of the rubber composition of the first layer C1 and the dynamic shear modulus of the rubber composition of the second layer C2 is greater than 1.1 and preferably greater than 1.2, the dynamic shear moduli being measured at 60° C. during a temperature sweep at an imposed stress of 0.7 MPa and at a frequency of 10 Hz.

This modulus ratio between the two layers C1 and C2 of the tread enables the layer C1 to stiffen the tread and the crown of the tyre. This improves the roadholding of the tyre.

Preferentially, K is less than 2.5 and preferably less than or equal to 1.5.

Advantageously, the dynamic shear modulus of the rubber composition of the first layer C1 is between 1 and 2.5 MPa, the dynamic shear modulus being measured at 60° C. during a temperature sweep at an imposed stress of 0.7 MPa and at a frequency of 10 Hz.

Beyond such a ratio or such a dynamic modulus value, the grip performance of the tyre can be reduced when the layer C1 comes into contact with the ground on which it is running.

According to another subject of the invention, the tread comprises ribs separated by grooves with a bottom, the limit of use of the tyre being defined by a minimum radial height h of these ribs relative to the bottoms thereof, VC1 and VC2 being the volumes of materials C1 and C2 located in the tread at a radial height greater than said minimum radial height h, the VC1/VC2 ratio is greater than 15%, preferentially greater than 25% and even more preferentially greater than 35%.

Below 15%, the improvements in rolling resistance and stiffness of the tread become insufficient.

Preferentially, the VC1/VC2 ratio is less than 75%.

Above a ratio of 75%, there is a reduction in the grip performance of the tyre when the tread surface becomes predominantly bound to the layer C1.

DESCRIPTION OF THE FIGURES

The features of the invention will be better understood with the aid of the appended drawing in which FIG. 1 represents a partial axial half-section of a tyre.

DETAILED DESCRIPTION OF THE INVENTION

FIG. 1, not represented to scale so as to facilitate the understanding thereof, shows a view in partial section in a meridian plane of the crown of a tyre 1 according to the invention. This tyre 1 comprises in particular, radially from the inside to the outside, a carcass reinforcement 2, a crown reinforcement 3 and a tread 4 which extends laterally by means of a sidewall 5. The tread 4 comprises a first layer C1 and a second layer C2. The tread 4 also has circumferential grooves 6. In new condition, the radially outer surface of the layer C2 constitutes the tread surface of the tyre on a ground on which it is running. On the other hand, gradually as the tread wears, the layer C1 comes into contact with the ground on which it is running.

FIG. 1 also shows the median plane EP and the axis of rotation YY'.

The circumferential grooves 6 include bosses or wear indicators that are intended to illustrate the maximum legally acceptable wear of the tread. The axially outer circumferential groove 6 shows such a boss 61. When the tread surface against the ground on which it is running is at the level of the wear indicators, the tyre is worn and must be changed. The regulatory minimum height is 1.6 mm and the wear indicators usually have a slightly higher height h. This height is measured from the bottoms 62 of the circumferential grooves 6.

The line L corresponds to the intersection between the toric surface S of general shape of the tread surface of the tread and offset radially outwardly relative to the bottoms of the circumferential grooves by a height h. The volume V of the tread corresponds to the "usable" volume thereof. This volume is equal to the sum of the volumes VC1 of the layer C1 and VC2 of the layer C2 arranged radially outwardly relative to the surface S. The intersections of these volumes with the meridian plane of FIG. 1 correspond to the surfaces SC1 and SC2. In FIG. 1, the surfaces SC1 are slightly greyed out to distinguish them in the layer C1, and the surfaces SC2 are also represented with a texture of dots to distinguish them in the layer C2.

In the example presented in FIG. 1, the ratio of the two volumes in new condition is about 40%.

FIG. 1 clearly illustrates the role of stiffening the tread and the crown of the tyre when the dynamic modulus ratio between the two rubber blends of layers C1 and C2 is greater than 1.1 and preferentially greater than 1.2. It is preferable not to exceed a ratio of 2.5, and very preferentially 1.5, so as not to degrade the grip of the tyre when the tread surface is due in large part to the layer C1.

In what follows, any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b). The abbreviation "phr" means parts by weight per hundred parts by weight of elastomer (of the total of the elastomers if several elastomers are present).

In the present application, the expression "all of the monomer units of the elastomer" or "the total amount of the monomer units of the elastomer" means all the constituent repeating units of the elastomer which result from the insertion of the monomers into the elastomer chain by polymerization. Unless otherwise indicated, the contents of a monomer unit or repeating unit in the highly saturated diene elastomer are given as molar percentages calculated on the basis of the monomer units of the copolymer, that is to say on the basis of all of the monomer units of the elastomer.

The compounds mentioned in the description may be of fossil or biobased origin. In the latter case, they can result, partially or completely, from biomass or be obtained from renewable starting materials resulting from biomass. Elastomers, plasticizers, fillers and the like are notably concerned.

The copolymer of ethylene and of 1,3-diene which is useful for the purposes of the invention is a preferably random elastomer which comprises ethylene units resulting from the polymerization of ethylene. In a known way, the expression "ethylene unit" refers to the $-(CH_2-CH_2)-$ unit resulting from the insertion of ethylene into the elastomer chain. In the copolymer of ethylene and of 1,3-diene, the ethylene units represent more than 50 mol % of the monomer units of the copolymer. Preferably, the ethylene units in the copolymer represent more than 60 mol %, advantageously more than 70 mol % of the monomer units of the copolymer. According to any one of the embodiments of the invention, including their preferential alternative forms, the highly saturated diene elastomer preferentially comprises at most 90 mol % of ethylene unit.

The copolymer which is useful for the purposes of the invention, also referred to below under the name "highly saturated diene elastomer", also comprises 1,3-diene units resulting from the polymerization of a 1,3-diene, the 1,3-diene being 1,3-butadiene or isoprene. In a known manner, the term "1,3-diene unit" refers to units resulting from the insertion of the 1,3-diene via a 1,4 addition, a 1,2 addition or a 3,4 addition in the case of isoprene. Preferably, the 1,3-diene is 1,3-butadiene.

According to a first embodiment of the invention, the copolymer of ethylene and of a 1,3-diene contains units of formula (I). The presence of a saturated 6-membered cyclic unit, 1,2-cyclohexanediyl, of formula (I) as a monomer unit in the copolymer can result from a series of very particular insertions of ethylene and 1,3-butadiene in the polymer chain during its growth.

(I)

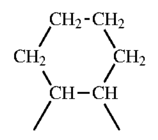

According to a second preferential embodiment of the invention, the copolymer of ethylene and of a 1,3-diene contains units of formula (II-1) or (II-2).

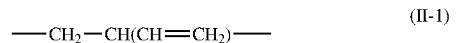

$$-CH_2-CH(CH=CH_2)- \quad \text{(II-1)}$$

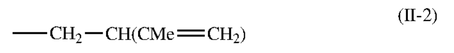

$$-CH_2-CH(CMe=CH_2) \quad \text{(II-2)}$$

According to a third preferential embodiment of the invention, the copolymer of ethylene and of a 1,3-diene contains units of formula (I) and of formula (II-1).

According to a fourth embodiment of the invention, the highly saturated diene elastomer is devoid of units of formula (I). According to this fourth embodiment, the copolymer of ethylene and of a 1,3-diene preferably contains units of formula (II-1) or (II-2).

Preferably, the highly saturated diene elastomer contains units resulting from the insertion of the 1,3-diene by a 1,4 addition, that is to say units of formula $-CH_2-CH=CH-CH_2-$ when the 1,3-diene is 1,3-butadiene, or of formula $-CH_2-CMe=C-CH_2-$ when the 1,3-diene is isoprene.

When the highly saturated diene elastomer comprises units of formula (I) or units of formula (II-1) or else comprises units of formula (I) and units of formula (II-1), the molar percentages of units of formula (I) and of units of formula (II-1) in the highly saturated diene elastomer, respectively o and p, preferably satisfy the following equation (eq. 1), more preferentially the equation (eq. 2), o and p being calculated on the basis of all the monomer units of the highly saturated diene elastomer.

$$0 < o + p \leq 25 \quad \text{(eq. 1)}$$

$$0 < o + p < 20 \quad \text{(eq. 2)}$$

According to the first embodiment, according to the second embodiment of the invention, according to the third embodiment and according to the fourth embodiment, including the preferential alternative forms thereof, the highly saturated diene elastomer is preferentially a random copolymer.

The highly saturated diene elastomer, in particular according to the first embodiment, according to the second embodiment, according to the third embodiment and according to the fourth embodiment, can be obtained according to various synthesis methods known to those skilled in the art, in particular as a function of the intended microstructure of the highly saturated diene elastomer. Generally, it may be prepared by copolymerization at least of a 1,3-diene, preferably 1,3-butadiene, and of ethylene and according to known synthesis methods, in particular in the presence of a catalytic system comprising a metallocene complex. Mention may be made in this respect of catalytic systems based on metallocene complexes, these catalytic systems being described in the documents EP 1 092 731, WO 2004035639, WO 2007054223 and WO 2007054224 in the name of the Applicant. The highly saturated diene elastomer, including the case when it is random, may also be prepared via a process using a catalytic system of preformed type such as those described in the documents WO 2017093654 A1, WO 2018020122 A1 and WO 2018020123 A1.

The highly saturated diene elastomer may consist of a mixture of copolymers of ethylene and of 1,3-diene which differ from each other by virtue of their microstructures or their macrostructures.

According to the first embodiment of the invention, according to the second embodiment of the invention, according to the third embodiment and according to the fourth embodiment, the highly saturated diene elastomer is preferably a copolymer of ethylene and of 1,3-butadiene, more preferentially a random copolymer of ethylene and of 1,3-butadiene.

According to one particular embodiment of the invention, the copolymer of ethylene and of a 1,3-diene bears at the chain end a functional group F1 which is a silanol or alkoxysilane function. This embodiment is also favourable to improving the rolling resistance.

According to this embodiment, the silanol or alkoxysilane function is located at the end of the chain of the highly saturated diene elastomer. In the present application, the alkoxysilane or silanol function borne at one of the ends is referred to in the present application by the name the functional group F1. Preferably, it is attached directly via a covalent bond to the terminal unit of the highly saturated diene elastomer, which means to say that the silicon atom of the function is directly bonded, covalently, to a carbon atom of the terminal unit of the highly saturated diene elastomer. The terminal unit to which the functional group F1 is directly attached preferably consists of a methylene bonded to an ethylene unit or to a 1,2-cyclohexanediyl unit, of formula (I), the Si atom being bonded to the methylene. A terminal unit is understood to mean the last unit inserted in the copolymer chain by copolymerization, which unit is preceded by the penultimate unit, which is itself preceded by the antepenultimate unit.

According to a first alternative form of this embodiment, the functional group F1 is of formula (III-a)

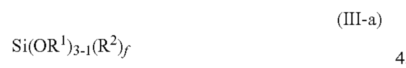

$Si(OR^1)_{3-f}(R^2)_f$ (III-a)

the R1 symbols, which may be identical or different, representing an alkyl, the $R^2$ symbols, which may be identical or different, representing a hydrogen atom, a hydrocarbon-based chain or a hydrocarbon-based chain substituted by a chemical function $F^2$, f being an integer ranging from 0 to 2.

In formula (III-a), the $R^1$ symbols are preferentially an alkyl having at most 6 carbon atoms, more preferentially a methyl or an ethyl, more preferentially still a methyl.

If 3-f is greater than 1, the $R^1$ symbols are advantageously identical, in particular methyl or ethyl, more particularly methyl.

According to a second alternative form of this embodiment, the functional group $F^1$ is of formula (III-b)

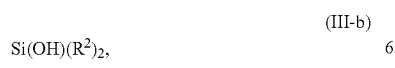

$Si(OH)(R^2)_2$, (III-b)

the $R^2$ symbols, which may be identical or different, representing a hydrogen atom, a hydrocarbon-based chain or a hydrocarbon-based chain substituted by a chemical function $F^2$.

Among the hydrocarbon-based chains represented by the R2 symbols in formulae (III-a) and (III-b), mention may be made of alkyls, in particular those having 1 to 6 carbon atoms, preferentially methyl or ethyl, more preferentially methyl.

Among the hydrocarbon-based chains substituted by a chemical function F2 represented by the R2 symbols in formulae (III-a) and (III-b), mention may be made of alkanediyl chains, in particular those comprising at most 6 carbon atoms, very particularly the 1,3-propanediyl group, the alkanediyl group bearing a substituent, the chemical function F2, in other words one valence of the alkanediyl chain for the function F2, the other valence for the silicon atom of the silanol or alkoxysilane function.

In formulae (III-a) and (III-b), a chemical function F2 is understood to mean a group which is different from a saturated hydrocarbon-based group and which may participate in chemical reactions. Among the chemical functions which may be suitable, mention may be made of the ether function, the thioether function, the primary, secondary or tertiary amine function, the thiol function, the silyl function. The primary or secondary amine or thiol functions may be protected or may not be protected. The protective group for the amine and thiol functions is for example a silyl group, in particular a trimethylsilyl or tert-butyldimethylsilyl group. Preferably, the chemical function F2 is a primary, secondary or tertiary amine function or a thiol function, the primary or secondary amine or thiol function being protected by a protective group or being unprotected.

Preferably, the R2 symbols, which may be identical or different, represent an alkyl having at most 6 carbon atoms or an alkanediyl chain having at most 6 carbon atoms and substituted by a chemical function F2 in formulae (III-a) and (III-b).

Mention may be made, as functional group F1, of the dimethoxymethylsilyl, dimethoxyethylsilyl, diethoxymethysilyl, diethoxyethysilyl, 3-(N,N-dimethylamino) propyldimethoxysilyl, 3-(N,N-dimethylamino) propyldiethoxysilyl, 3-aminopropyldimethoxysilyl, 3-aminopropyldiethoxysilyl, 3-thiopropyldimethoxysilyl, 3-thiopropyldiethoxysilyl, methoxydimethylsilyl, methoxydiethylsilyl, ethoxydimethysilyl, ethoxydiethysilyl, 3-(N,N-dimethylamino) propylmethoxymethylsilyl, 3-(N,N-dimethylamino) propylmethoxyethylsilyl, 3-(N,N-dimethylamino) propylethoxymethylsilyl, 3-(N,N-dimethylamino) propylethoxyethylsilyl, 3-aminopropylmethoxymethylsilyl, 3-aminopropylmethoxyethylsilyl, 3-aminopropylethoxymethylsilyl, 3-aminopropylethoxyethylsilyl, 3-thiopropylmethoxymethylsilyl, 3-thiopropylethoxymethylsilyl, 3-thiopropylmethoxyethylsilyl and 3-thiopropylethoxyethylsilyl groups.

Mention may also be made, as functional group F1, of the silanol form of the functional groups mentioned above which contain one and only one ethoxy or methoxy function, it being possible for the silanol form to be obtained by hydrolysis of the ethoxy or methoxy function. In this regard, the dimethylsilanol, diethylsilanol, 3-(N,N-dimethylamino) propylmethylsilanol, 3-(N,N-dimethylamino) propylethylsilanol, 3-aminopropylmethylsilanol, 3-aminopropylethylsilanol, 3-thiopropylethylsilanol and 3-thiopropylmethylsilanol groups are suitable.

Mention may also be made, as functional group F1, of the functional groups whether they are in the alkoxy or silanol form, which have been mentioned above and which comprise an amine or thiol function in a form protected by a silyl group, in particular a trimethylsilyl or tert-butyldimethylsilyl group.

Preferably, the functional group F1 is of formula (III-a) in which f is equal to 1. For this preferential alternative form, the groups for which R1 is a methyl or an ethyl, such as for example the dimethoxymethylsilyl, dimethoxyethylsilyl, diethoxymethysilyl, diethoxyethysilyl, 3-(N,N-dimethylamino) propyldimethoxysilyl, 3-(N,N-dimethylamino) propyldiethoxysilyl, 3-aminopropyldimethoxysilyl, 3-aminopropyldiethoxysilyl, 3-thiopropyldimethoxysilyl and 3-thiopropyldiethoxysilyl groups, are very particularly suitable. Also suitable are the protected forms of the amine or thiol function of the last 4 functional groups mentioned in the preceding list, protected by a silyl group, in particular a trimethylsilyl or tert-butyldimethylsilyl group.

More preferentially, the functional group F1 is of formula (III-a) in which f is equal to 1 and R1 is a methyl. For this more preferential alternative form, the dimethoxymethylsilyl, dimethoxyethylsilyl, 3-(N,N-dimethylamino) propyldimethoxysilyl, 3-aminopropyldimethoxysilyl and 3-thiopropyldimethoxysilyl groups, and also the protected forms of the amine or thiol function of 3-aminopropyldimethoxysilyl or 3-thiopropyldimethoxysilyl, protected by a trimethylsilyl or a tert-butyldimethylsilyl, are very particularly suitable.

The copolymer of ethylene and of a 1,3-diene which bears at the chain end a functional group F1, silanol or alkoxysilane function, can be prepared by the process described in the patent application filed under number PCT/FR2018/051305 or in the patent application filed under number PCT/FR2018/051306, which process comprises steps (a) and (b), and, where appropriate, step (c) below:

(a) the copolymerization of a monomer mixture in the presence of a catalytic system comprising an organomagnesium compound and a metallocene;
(b) the reaction of a functionalizing agent with the polymer obtained in step (a);
(c) where appropriate, a hydrolysis reaction.

Step (a) is common to the copolymerization step carried out to prepare the non-functional homologous copolymers described above, with the only difference being that the copolymerization reaction is followed by a reaction for functionalization of the copolymer, step (b).

Step (b) consists in reacting a functionalizing agent with the copolymer obtained in step (a) in order to functionalize the copolymer at the chain end. The functionalizing agent is a compound of formula (IV), (IV)

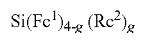

$Si(Fc^1)_{4-g}(Rc^2)_g$ the Fc1 symbols, which may be identical or different, representing an alkoxy group or a halogen atom;
the Rc2 symbols, which may be identical or different, representing a hydrogen atom, a hydrocarbon-based chain or a hydrocarbon-based chain substituted by a chemical function Fc2;
g being an integer ranging from 0 to 2.

When the Fc1 symbol represents an alkoxy group, the alkoxy group is preferably methoxy or ethoxy. When the Fc1 symbol represents a halogen atom, the halogen atom is preferably chlorine.

The functionalizing agent can be of formula (IV-1), of formula (IV-2), of formula (IV-3) or of formula (IV-4), (IV-1)

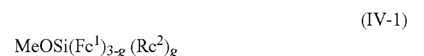

$MeOSi(Fc^1)_{3-g}(Rc^2)_g$ (IV-2)

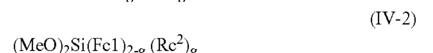

$(MeO)_2Si(Fc1)_{2-g}(Rc^2)_g$ (IV-3)

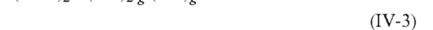

$(MeO)_3Si(Fc^1)_{1-g}(Rc^2)_g$ (IV-4)

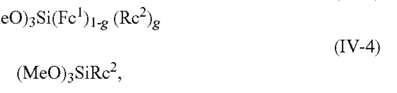

$(MeO)_3SiRc^2$, in which the Fc1 and Rc2 symbols are as defined in formula (IV);
for formulae (IV-1) and (IV-2), g being an integer ranging from 0 to 2;
for formula (IV-3), g being an integer ranging from 0 to 1.

Among the hydrocarbon-based chains represented by the Rc2 symbols in formulae (III), (IV-1), (IV-2), (IV-3) and (IV-4), mention may be made of alkyls, preferably alkyls having at most 6 carbon atoms, more preferentially methyl or ethyl, better still methyl.

Among the hydrocarbon-based chains substituted by a chemical function Fc2 which are represented by the Rc2 symbols in formulae (IV), (IV-1), (IV-2), (IV-3) and (IV-4), mention may be made of alkanediyl chains, preferably those comprising at most 6 carbon atoms, more preferentially the 1,3-propanediyl group, the alkanediyl group bearing a substituent, the chemical function Fc2, in other words one valence of the alkanediyl chain for the function F2, the other valence for the silicon atom of the silanol or alkoxysilane function.

In formulae (IV), (IV-1), (IV-2), (IV-3) and (IV-4), a chemical function is understood to mean a group which is different from a saturated hydrocarbon-based group and which may participate in chemical reactions. Those skilled in the art understand that the chemical function Fc2 is a group that is chemically inert with respect to the chemical species present in the polymerization medium. The chemical function Fc2 may be in a protected form, such as for example in the case of the primary amine, secondary amine or thiol function. Mention may be made, as chemical function Fc2, of the ether, thioether, protected primary amine, protected secondary amine, tertiary amine, protected thiol, and silyl functions. Preferably, the chemical function Fc2 is a protected primary amine function, a protected secondary amine function, a tertiary amine function or a protected thiol function. As protective groups for the primary amine, secondary amine and thiol functions, mention may be made of silyl groups, for example the trimethylsilyl and tert-butyldimethylsilyl groups.

g is preferably other than 0, which means that the functionalizing agent comprises at least one Si-Rc2 bond.

Mention may be made, as functionalizing agent, of the compounds dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl) trimethoxysilane, (N,N-dimethylaminopropyl)triethoxysilane, (N-(3-trimethoxysilyl) propyl)-N-(trimethylsilyl) silanamine, (N-(3-triethoxysilyl) propyl)-N-(trimethylsilyl) silanamine and 3,3-dimethoxy-8,8,9,9-tetramethyl-2-oxa-7- thia-3,8-disiladecane, preferably dimethoxydimethylsilane, dimethoxydiethylsilane, (N,N-dimethyl-3-aminopropyl) methyldimethoxysilane, (N,N-dimethyl-3-aminopropyl)ethyldimethoxysilane, 3-methoxy-3,8,8,9,9-pentamethyl-2-oxa-7-thia-3,8-disiladecanetrimethoxymethylsilane, trimethoxyethylsilane, (N,N-dimethylaminopropyl) trimethoxysilane, (N-(3-trimethoxysilyl) propyl)-N-(trimethylsilyl) silanamine and 3,3-dimethoxy-8,8,9,9-tetramethyl-2-oxa-7-thia-3,8-disiladecane, more preferentially trimethoxymethylsilane, trimethoxyethylsilane, (N,N-dimethylaminopropyl) trimethoxysilane, (N-(3-trimethoxysilyl) propyl)-N-(trimethylsilyl) silanamine and 3,3-dimethoxy-8,8,9,9-tetramethyl-2-oxa-7-thia-3,8-disiladecane.

The functionalizing agent is typically added to the polymerization medium resulting from step (a). It is typically added to the polymerization medium at a degree of conversion of the monomers selected by those skilled in the art depending on the desired macrostructure of the elastomer. Since step (a) is generally carried out under ethylene pressure, a degassing of the polymerization reactor may be carried out before the addition of the functionalizing agent. The functionalizing agent is added under inert and anhydrous conditions to the polymerization medium, maintained at the polymerization temperature. Use is typically made of from 0.25 to 10 mol of functionalizing agent per 1 mol of cocatalyst, preferably of from 2 to 4 mol of functionalizing agent per 1 mol of cocatalyst.

The functionalizing agent is brought into contact with the polymerization medium for a time sufficient to enable the functionalization reaction. This contact time is judiciously selected by those skilled in the art as a function of the concentration of the reaction medium and of the temperature of the reaction medium. Typically, the functionalization reaction is carried out under stirring, at a temperature ranging from 17° C. to 80° C., for 0.01 to 24 hours.

Once functionalized, the elastomer may be recovered, in particular by isolating it from the reaction medium. The techniques for separating the elastomer from the reaction medium are well known to those skilled in the art and are selected by those skilled in the art depending on the amount of elastomer to be separated, its macrostructure and the tools available to those skilled in the art. Mention may be made, for example, of the techniques of coagulating the elastomer in a solvent such as methanol, the techniques of evaporating the solvent of the reaction medium and the residual monomers, for example under reduced pressure.

When the functionalizing agent is of formula (IV), (IV-1) or (IV-2) and g is equal to 2, step (b) may be followed by a hydrolysis reaction in order to form an elastomer bearing a silanol function at the chain end. The hydrolysis may be carried out by a step of stripping of the solution containing the elastomer at the end of step (b), in a manner known to those skilled in the art.

When the functionalizing agent is of formula (IV), (IV-1), (IV-2), (IV-3) or (IV-4), when g is other than 0 and when Rc2 represents a hydrocarbon-based chain substituted by a function Fc2 in a protected form, step (b) may also be followed by a hydrolysis reaction in order to deprotect the function at the end of the chain of the elastomer. The hydrolysis reaction, step of deprotecting the function, is generally carried out in an acid or basic medium depending on the chemical nature of the function to be deprotected. For example, a silyl group, in particular a trimethylsilyl or tert-butyldimethylsilyl group, which protects an amine or thiol function may be hydrolysed in an acid or basic medium in a manner known to those skilled in the art. The choice of the deprotection conditions is judiciously made by those skilled in the art taking into account the chemical structure of the substrate to be deprotected.

Step (c) is an optional step depending on whether or not it is desired to convert the functional group into a silanol function or whether or not it is desired to deprotect the protected function. Preferentially, step (c) is carried out before separating the elastomer from the reaction medium at the end of step (b) or else at the same time as this separation step.

Whether or not it bears a silanol or alkoxysilane function, the content of the copolymer of ethylene and of a 1,3-diene is greater than 50 phr, preferentially greater than 70 phr. The remainder to 100 phr can be any diene elastomer, for example a 1,3-butadiene homopolymer or copolymer or else an isoprene homopolymer or copolymer. Advantageously, the content of the copolymer of ethylene and of a 1,3-diene is 100 phr. A high content of the copolymer in the rubber composition is even more favourable for the performance compromise between rolling resistance, wear resistance and grip.

Another essential characteristic of the rubber composition of layer C1 is that it comprises a reinforcing filler and a plasticizing system. The plasticizing system is preferably hydrocarbon-based.

Advantageously, the reinforcing filler comprises a silica.

A reinforcing filler typically consists of nanoparticles of which the mean (weight-average) size is less than a micrometre, generally less than 500 nm, usually between 20 and 200 nm, in particular and more preferentially between 20 and 150 nm.

The content of reinforcing filler in the rubber composition of layer C1 is advantageously greater than or equal to 35 phr and less than or equal to 100 phr, preferably greater than or equal to 50 phr and less than or equal to 100 phr. Preferably, the silica represents more than 50% by weight of the reinforcing filler. More preferentially, the silica represents more than 85% by weight of the reinforcing filler.

Optionally, the reinforcing filler of the rubber composition of layer C1 comprises from 35 to 100 phr of a reinforcing filler which comprises a silica.

The silica used can be any reinforcing silica known to those skilled in the art, in particular any precipitated or fumed silica exhibiting a BET specific surface area and a CTAB specific surface area both of less than 450 $m^2/g$, preferably within a range extending from 30 to 400 $m^2/g$, in particular from 60 to 300 $m^2/g$. In the present account, the BET specific surface area is determined by gas adsorption using the Brunauer-Emmett-Teller method described in "The Journal of the American Chemical Society" (Vol. 60, page 309, February 1938), and more specifically according to a method adapted from Standard NF ISO 5794-1, Appendix E of June 2010 [multipoint (5 point) volumetric method-gas: nitrogen-degassing under vacuum: one hour at 160° C.—relative pressure p/po range: 0.05 to 0.17].

The CTAB specific surface area values were determined according to Standard NF ISO 5794-1, Appendix G of June 2010. The process is based on the adsorption of CTAB (N-hexadecyl-N,N,N-trimethylammonium bromide) on the "external" surface of the reinforcing filler.

Any type of precipitated silica, in particular highly dispersible precipitated silicas (referred to as "HDS" for "highly dispersible" or "highly dispersible silica"), can be used. These precipitated silicas, which are or are not highly dispersible, are well known to those skilled in the art. Mention may be made, for example, of the silicas described in applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silicas, of the following commercial silicas: the Ultrasil® VN2GR and Ultrasil® VN3GR silicas from Evonik, the Zeosil® 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

The reinforcing filler may comprise any type of "reinforcing" filler other than silica, known for its capacity to reinforce a rubber composition which can be used in particular for the manufacture of tyres, for example a carbon black. All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used.

Preferably, the carbon black is used at a content of less than or equal to 20 phr, more preferentially less than or equal to 10 phr (for example the carbon black content may be in a range extending from 0.5 to 20 phr, in particular extending from 1 to 10 phr). Advantageously, the carbon black content in the rubber composition is less than or equal to 5 phr. Within the intervals indicated, the colouring properties (black pigmenting agent) and UV-stabilizing properties of the carbon blacks are beneficial, without, moreover, adversely affecting the typical performance qualities contributed by the silica.

To couple the reinforcing inorganic filler, in this case silica, to the elastomer, it is possible to use, in a well-known manner, an at least bifunctional coupling agent (or binding agent) intended to ensure a sufficient connection, of chemical and/or physical nature, between the inorganic filler (surface of its particles) and the elastomer, in which case the rubber composition of layer C1 comprises a coupling agent for binding the silica to the elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the elastomer.

Use is in particular made of silane polysulfides, referred to as "symmetrical" or "asymmetrical" depending on their specific structure, as described, for example, in applications WO03/002648-A1 (or US2005/016651-A1) and WO03/002649-A1 (or US2005/016650-A1). Suitable in particular, without the definition below being limiting, are silane polysulfides corresponding to general formula (V) below:

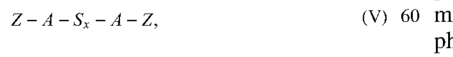

$$Z-A-S_x-A-Z, \qquad (V)$$

in which:

x is an integer from 2 to 8 (preferably from 2 to 5);

the A symbols, which may be identical or different, represent a divalent hydrocarbon radical (preferably a $C_1$-$C_{18}$ alkylene group or a $C_6$-$C_{12}$ arylene group, more particularly a $C_1$-$C_{10}$ alkylene, in particular a $C_1$-$C_4$ alkylene, in particular propylene);

the Z symbols, which may be identical or different, correspond to one of the three formulae below:

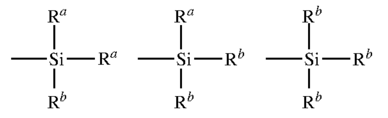

in which:

the Ra radicals, which are substituted or unsubstituted and identical to or different from one another, represent a $C_1$-$C_{18}$ alkyl group, a $C_5$-$C_{18}$ cycloalkyl group or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);

the Rb radicals, which are substituted or unsubstituted and identical to or different from one another, represent a $C_1$-$C_{18}$ alkoxyl group or a $C_5$-$C_{18}$ cycloalkoxyl group (preferably a group selected from $C_1$-$C_8$ alkoxyls and $C_5$-$C_8$ cycloalkoxyls, even more preferentially a group selected from $C_1$-$C_4$ alkoxyls, in particular methoxyl and ethoxyl), or a hydroxyl group, or such that two Rb radicals represent a $C_3$-$C_{18}$ dialkoxyl group.

In the case of a mixture of alkoxysilane polysulfides corresponding to the above formula (V), in particular normal commercially available mixtures, the mean value of the "x" indices is a fractional number preferably within a range extending from 2 to 5, more preferentially of approximately 4.

Mention will more particularly be made, as examples of silane polysulfides, of bis(($C_1$-$C_4$)alkoxyl($C_1$-$C_4$)alkylsilyl($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Among these compounds, use is made in particular of bis(3-triethoxysilylpropyl) tetrasulfide, abbreviated to TESPT, of formula $[(C_2H_5O)_3Si(CH_2)_3S_2]_2$ sold under the name Si69 by Evonik or bis(triethoxysilylpropyl) disulfide, abbreviated to TESPD, of formula $[(C_2H_5O)_3Si(CH_2)_3S]_2$ sold under the name Si75 by Evonik. Mention will also be made, as preferred examples, of bis(mono($C_1$-$C_4$)alkoxyldi($C_1$-$C_4$)alkylsilylpropyl) polysulfides (in particular disulfides, trisulfides or tetrasulfides), more particularly of bis(monoethoxydimethylsilylpropyl) tetrasulfide, such as described in the abovementioned patent application WO02/083782-A1 (or U.S. Pat. No. 7,217,751-B2).

Of course, use might also be made of mixtures of the coupling agents described above.

The content of coupling agent in the rubber composition of layer C1 is advantageously less than or equal to 25 phr, it being understood that it is generally desirable to use as little as possible thereof. Typically, the content of coupling agent represents from 0.5% to 15% by weight, with respect to the amount of reinforcing inorganic filler. Its content is preferentially within a range extending from 0.5 to 20 phr, more preferentially within a range extending from 3 to 15 phr. This content is easily adjusted by those skilled in the art according to the content of reinforcing inorganic filler used in the composition of layer C1 of the tread of the tyre of the invention.

Another essential characteristic of the rubber composition of layer C1 is that it comprises a plasticizing system. This plasticizing system advantageously comprises a plasticizing hydrocarbon-based resin and a hydrocarbon-based liquid plasticizing agent, it being understood that the total content of hydrocarbon-based plasticizing resin and of hydrocarbon-based liquid plasticizing agent is greater than 10 phr and less than or equal to 80 phr, preferably greater than or equal to 30 phr and less than or equal to 80 phr.

Hydrocarbon-based resins, also known as hydrocarbon-based plasticizing resins, are polymers well known to those skilled in the art, essentially based on carbon and hydrogen but which can comprise other types of atoms, for example oxygen, which can be used in particular as plasticizing agents or tackifying agents in polymer matrices. They are by nature at least partially miscible (i.e. compatible) at the contents used with the polymer compositions for which they are intended, so as to act as true diluents. They have been described, for example, in the book entitled "Hydrocarbon Resins" by R. Mildenberg, M. Zander and G. Collin (New York, VCH, 1997, ISBN 3-527-28617-9), Chapter 5 of which is devoted to their applications, notably in the tyre rubber field (5.5. "Rubber Tires and Mechanical Goods"). In a known way, these hydrocarbon-based resins can also be described as thermoplastic resins in the sense that they soften when heated and can thus be moulded. The softening point of the hydrocarbon-based resins is measured according to Standard ISO 4625 ("Ring and Ball" method). The Tg is measured according to Standard ASTM D3418 (1999). The macrostructure (Mw, Mn and PI) of the hydrocarbon-based resin is determined by size exclusion chromatography (SEC); solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The hydrocarbon-based resins may be aliphatic or aromatic or else of the aliphatic/aromatic type, that is to say based on aliphatic and/or aromatic monomers. They can be natural or synthetic, based or not based on petroleum (if such is the case, also known under the name of petroleum resins). Preferably, the hydrocarbon-based plasticizing resin has a glass transition temperature of greater than 20° C.

Advantageously, the hydrocarbon-based plasticizing resin has at least any one of the following characteristics, more preferentially all of them:

a Tg of greater than 30° C.;

a number-average molecular weight (Mn) of between 300 and 2000 g/mol, more preferentially between 400 and 1500 g/mol;

a polydispersity index (PI) of less than 3, more preferentially of less than 2 (as a reminder: PI=Mw/Mn with Mw the weight-average molecular weight).

Preferably, the hydrocarbon-based plasticizing resin is selected from the group consisting of cyclopentadiene homopolymer resins, cyclopentadiene copolymer resins, dicyclopentadiene homopolymer resins, dicyclopentadiene copolymer resins, terpene homopolymer resins, terpene copolymer resins, C5-cut homopolymer resins, C5-cut copolymer resins, C9-cut homopolymer resins, C9-cut copolymer resins, hydrogenated cyclopentadiene homopolymer resins and hydrogenated cyclopentadiene copolymer resins.

More preferentially, the hydrocarbon-based plasticizing resin is a C9-cut copolymer resin or a dicyclopentadiene copolymer resin, which is hydrogenated or non-hydrogenated. By way of example, mention may be most particularly made of C9-cut copolymer resins and hydrogenated dicyclopentadiene copolymer resins.

Hydrocarbon-based liquid plasticizing agents are known to soften a rubber composition by diluting the elastomer and the reinforcing filler of the rubber composition. Their Tg is typically less than −20° C., preferentially less than −40° C. Any hydrocarbon-based extender oil or any hydrocarbon-based liquid plasticizing agent known for its plasticizing properties with respect to diene elastomers can be used. At ambient temperature (23° C.), these plasticizers or these oils, which are more or less viscous, are liquids (that is to say, as a reminder, substances which have the ability to eventually take on the shape of their container), as opposed, in particular, to hydrocarbon-based plasticizing resins which are by nature solid at ambient temperature.

As hydrocarbon-based liquid plasticizing agents, mention may be made of liquid diene polymers, polyolefin oils, naphthenic oils, paraffinic oils, DAE oils, MES (Medium Extracted Solvate) oils, TDAE (Treated Distillate Aromatic Extract) oils, RAE (Residual Aromatic Extract) oils, TRAE (Treated Residual Aromatic Extract) oils and SRAE (Safety Residual Aromatic Extract) oils, mineral oils, and mixtures of these compounds.

Preferably, the hydrocarbon-based liquid plasticizing agent is selected from the group consisting of liquid diene polymers, aliphatic polyolefin oils, paraffinic oils, MES oils, TDAE oils, TRAE oils, SRAE oils, mineral oils and mixtures thereof. More preferentially, the hydrocarbon-based liquid plasticizing agent is a liquid diene polymer, an aliphatic polyolefin oil, a paraffinic oil, an MES oil or mixtures thereof.

According to one particular embodiment of the invention, the weight ratio between the content of hydrocarbon-based plasticizing resin and the total content of hydrocarbon-based plasticizing resin and of hydrocarbon-based liquid plasticizing agent is greater than 0.4. This particular embodiment is also favourable to improving the roadholding of a tyre, the tread of which comprises such a rubber composition.

The plasticizing system may contain, generally in a small amount, another plasticizing agent other than the hydrocarbon-based plasticizing resin and the hydrocarbon-based liquid plasticizing agent useful for the needs of the invention, in so far as the desired performance compromise is not detrimentally modified. This other plasticizing agent can be, for example, a processing agent conventionally used in a small amount to promote, for example, the dispersion of the silica. According to any one of the embodiments of the invention, the hydrocarbon-based plasticizing resin and the hydrocarbon-based liquid plasticizing agent advantageously represent substantially the main part of the plasticizing system, that is to say the ratio between the content of hydrocarbon-based plasticizing resin and of hydrocarbon-based liquid plasticizing agent to the content of the total plasticizing system in the rubber composition of layer C1, the contents being expressed in phr, is advantageously greater than 0.8, very advantageously greater than 0.9.

According to an advantageous characteristic of the rubber composition of layer C1, the weight ratio between the content of reinforcing filler and the total content of hydrocarbon-based plasticizing resin and of hydrocarbon-based liquid plasticizing agent is greater than or equal to 1.1, the contents being expressed in phr. Layer C1 according to this particular embodiment provides stiffening within the tread, which makes it possible to improve the roadholding of a tyre, the tread of which has a high-grip surface due to the use of a highly deformable rubber composition intended to come into contact with the ground.

The rubber composition of layer C1 can also comprise all or some of the usual additives customarily used in elastomer compositions intended for the manufacture of tyres, in particular pigments, protective agents such as anti-ozone waxes, chemical anti-ozonants, antioxidants, a crosslinking system which can be based either on sulfur or on sulfur donors and/or on peroxide and/or on bismaleimides, vulcanization accelerators or retarders, or vulcanization activators.

The actual crosslinking system is preferentially a vulcanization system, that is to say based on sulfur and on a primary vulcanization accelerator. The sulfur is typically provided in the form of molecular sulfur or of a sulfur-donating agent, preferably in molecular form. Sulfur in molecular form is also referred to by the term "molecular sulfur". The term "sulfur donor" means any compound which releases sulfur atoms, optionally combined in the form of a polysulfide chain, which are capable of inserting into the polysulfide chains formed during the vulcanization and bridging the elastomer chains. Various known secondary vulcanization accelerators or vulcanization activators, such as zinc oxide, stearic acid, guanidine derivatives (in particular diphenylguanidine), and the like, are added to the vulcanization system, being incorporated during the first non-productive phase and/or during the productive phase. The sulfur content is preferably between 0.5 and 3.0 phr and the content of the primary accelerator is preferably between 0.5 and 5.0 phr. These preferential contents may apply to any one of the embodiments of the invention.

Use may be made, as (primary or secondary) vulcanization accelerator, of any compound that is capable of acting as accelerator of the vulcanization of diene elastomers in the presence of sulfur, notably accelerators of the thiazole type and also derivatives thereof, accelerators of sulfenamide type as regards the primary accelerators, or accelerators of thiuram, dithiocarbamate, dithiophosphate, thiourea and xanthate type as regards the secondary accelerators. As examples of primary accelerators, mention may notably be made of sulfenamide compounds such as N-cyclohexyl-2-benzothiazylsulfenamide ("CBS"), N,N-dicyclohexyl-2-benzothiazylsulfenamide ("DCBS"), N-tert-butyl-2-benzothiazylsulfenamide ("TBBS"), and mixtures of these compounds. The primary accelerator is preferentially a sulfenamide, more preferentially N-cyclohexyl-2-benzothiazylsulfenamide. As examples of secondary accelerators, mention may notably be made of thiuram disulfides such as tetraethylthiuram disulfide, tetrabutylthiuram disulfide ("TBTD"), tetrabenzylthiuram disulfide ("TBZTD") and mixtures of these compounds. The secondary accelerator is preferentially a thiuram disulfide, more preferentially tetrabenzylthiuram disulfide.

The crosslinking (or curing), where appropriate the vulcanization, is carried out in a known manner at a temperature generally of between 130° C. and 200° C., for a sufficient time which may vary, for example, between 5 and 90 min, depending especially on the curing temperature, on the crosslinking system adopted and on the crosslinking kinetics of the composition in question.

The rubber composition, before crosslinking, may be manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 110° C. and 190° C., preferably between 130° C. and 180° C., followed by a second phase of mechanical working (sometimes referred to as a "productive" phase) at lower temperature, typically below 110° C., for example between 40° C. and 100° C., during which finishing phase the sulfur or the sulfur donor and the vulcanization accelerator are incorporated.

By way of example, the first (non-productive) phase is carried out in a single thermomechanical step during which all the necessary constituents, the optional additional processing agents and various other additives, with the exception of the crosslinking system, are introduced into an appropriate mixer, such as a normal internal mixer. The total duration of the kneading, in this non-productive phase, is preferably between 1 and 15 min. After cooling of the mixture thus obtained during the first non-productive phase, the crosslinking system is then incorporated at low temperature, generally in an external mixer, such as an open mill; everything is then mixed (productive phase) for a few minutes, for example between 2 and 15 min.

The rubber composition can be calendered or extruded in the form of a sheet or of a slab, in particular for a laboratory characterization, or also in the form of a rubber semi-finished product (or profiled element) which can be used in a tyre. The composition can be either in the raw state (before crosslinking or vulcanization) or in the cured state (after crosslinking or vulcanization), can be a semi-finished product which can be used in a tyre.

Determination of the microstructure of the elastomers:

The microstructure of the elastomers is determined by $^{1}H$ NMR analysis, compensated for by the $^{13}C$ NMR analysis when the resolution of the 1H NMR spectra does not make it possible to assign and quantify all the entities. The measurements are carried out using a Bruker 500 MHz NMR spectrometer at frequencies of 500.43 MHz for observing protons and 125.83 MHz for observing carbons.

For the insoluble elastomers which have the capacity of swelling in a solvent, a 4 mm z-grad HRMAS probe is used for proton and carbon observation in proton-decoupled mode. The spectra are acquired at rotational speeds of from 4000 Hz to 5000 Hz.

For the measurements on soluble elastomers, a liquid NMR probe is used for proton and carbon observation in proton-decoupled mode.

The preparation of the insoluble samples is performed in rotors filled with the analysed material and a deuterated solvent enabling swelling, generally deuterated chloroform ($CDCl_3$). The solvent used must always be deuterated and its chemical nature may be adapted by those skilled in the art. The amounts of material used are adjusted so as to obtain spectra of sufficient sensitivity and resolution.

The soluble samples are dissolved in a deuterated solvent (about 25 mg of elastomer in 1 ml), generally deuterated chloroform ($CDCl_3$). The solvent or solvent blend used must always be deuterated and its chemical nature may be adapted by those skilled in the art.

In both cases (soluble sample or swollen sample):

A 30° single pulse sequence is used for proton NMR. The spectral window is adjusted to observe all the resonance lines belonging to the molecules analysed. The accumulation number is adjusted in order to obtain a signal to noise ratio that is sufficient for the quantification of each subunit. The recycle delay between each pulse is adapted to obtain a quantitative measurement.

For the carbon NMR, a single 30° pulse sequence is used with proton decoupling only during acquisition to avoid the "nuclear Overhauser" effects (NOE) and to remain quantitative. The spectral window is adjusted to observe all the resonance lines belonging to the molecules analysed. The accumulation number is adjusted in order to obtain a signal to noise ratio that is sufficient for the quantification of each subunit. The recycle delay between each pulse is adapted to obtain a quantitative measurement.

The NMR measurements are performed at 25° C.

Determination of the Mooney viscosity:

The Mooney viscosity is measured using an oscillating consistometer as described in Standard ASTM D1646 (1999). The measurement is carried out according to the following principle: the sample, analysed in the uncured state (i.e. before curing), is moulded (shaped) in a cylindrical chamber heated to a given temperature (100° C.). After preheating for 1 minute, the rotor rotates within the test specimen at 2 revolutions/minute and the working torque for maintaining this movement is measured after rotating for 4 minutes. The Mooney viscosity is expressed in "Mooney unit" (MU, with 1 MU=0.83 newton.metre).

The stiffness of the rubber compositions was evaluated by determining the dynamic shear modulus G*. The response of a sample of vulcanized composition subjected to a sinusoidal alternating shear stress at an imposed stress of 0.7 MPa and at a frequency of 10 Hz, during a temperature sweep, at a minimum temperature of less than the Tg of the elastomers of the compositions up to a maximum temperature greater than 100° C. is recorded; the values of G* are taken at the temperature of 60° C.

Six rubber compositions T1 and M1 to M5, the formulation details of which appear in Table 1, were prepared as follows:

The elastomers, the reinforcing fillers and the various other ingredients, with the exception of the sulfur and the vulcanization accelerator, are successively introduced into an internal mixer (final degree of filling: approximately 70% by volume), the initial vessel temperature of which is about 80° C. Thermomechanical working (non-productive phase) is then performed in one step, which lasts in total approximately 3 to 4 min, until a maximum "dropping" temperature of 165° C. is reached. The mixture thus obtained is recovered and cooled, and the sulfur and the vulcanization accelerator are then incorporated on a mixer (homofinisher) at 30° C., the whole being kneaded (productive phase) for an appropriate time (for example approximately ten minutes).

The compositions thus obtained are then calendered either in the form of plates (thickness 2 to 3 mm) or of thin sheets of rubber for the measurement of their physical or mechanical properties, or extruded to form for example a profiled element for a tyre.

The five rubber compositions M1 to M5 all contain a copolymer of ethylene and of 1,3-butadiene in which the content of ethylene units is greater than 50%. In the composition M5, the copolymer bears a silanol or alkoxysilane function at the chain end.

The copolymer of ethylene and of 1,3-butadiene (EBR) used in the compositions M1 to M4 is prepared according to the following procedure:

The cocatalyst, the butyloctylmagnesium (BOMAG) (0.00021 mol/l) and then the metallocene $[\{Me_2SiFlu_2Nd(\mu\text{-}BH_4)_2Li(THF)\}_2]$ (0.07 mol/l) are added to a reactor containing methylcyclohexane, the Flu symbol representing the $C_{13}H_8$ group. The alkylation time is 10 minutes, the reaction temperature is 20° C. Then, the monomers in the form of a gas mixture of ethylene/1,3-butadiene molar composition: 80/20 are added continuously. The polymerization is carried out under conditions of constant temperature and pressure of 80° C. and 8 bar. The polymerization reaction is stopped by cooling, degassing of the reactor and addition of ethanol. An antioxidant is added to the polymer solution. The copolymer is recovered by drying in an oven under vacuum to constant weight.

In the EBR copolymer, the molar content of ethylene units is 79%, the molar content of 1,4 units is 6%, the molar content of 1,2 units is 8%, and the molar content of 1,2-cyclohexanediyl units is 7%. The Mooney viscosity is 85.

For the EBR-F copolymer used in the rubber composition M5, the copolymer is prepared according to the same procedure as the EBR copolymer, with one difference which is as follows:

When the desired monomer conversion is achieved, the content of the reactor is degassed and then the functionalizing agent, (N,N-dimethyl-3-aminopropyl)methyldimethoxysilane, is introduced under an inert atmosphere by excess pressure. The reaction medium is stirred for a time of 15 minutes and a temperature of 80° C. After reaction, the medium is degassed and then precipitated from methanol. The polymers are redissolved in toluene, then precipitated out into methanol so as to eliminate the ungrafted "silane" molecules, which makes it possible to improve the quality of the signals of the spectra for the quantification of the functional group content and the integration of the various signals. The polymer is treated with antioxidant then dried at 60° C. under vacuum to constant weight.

In the EBR-F copolymer, the molar content of ethylene units is 76%, the molar content of 1,4 units is 6%, the molar content of 1,2 units is 9%, and the molar content of 1,2-cyclohexanediyl units is 9%. The Mooney viscosity is 84.

TABLE 1

| Composition | T1 | M1 (C1) | M2 (C1) | M3 (C1) | M4 (C1) | M5 (C1) |
|---|---|---|---|---|---|---|
| SBR (1) | 100 | | | | | |
| EBR (2) | | 100 | 100 | 100 | 100 | |
| EBR-F (3) | | | | | | 100 |
| Carbon black (4) | 5 | 3 | 3 | 3 | 3 | 3 |
| Silica (5) | 110 | 75 | 91 | 63 | 83 | 63 |
| Oil (6) | 20 | | | | | |
| Resin (7) | 50 | | | | | |
| Liquid plasticizing agent (8) | | 38 | 26 | 10 | 20 | 23 |
| Plasticizing resin (9) | | 32 | 31 | 25 | 23 | 23 |
| Antioxidant (10) | | 2 | 2 | 2 | 2 | 2 |
| Anti-ozonant wax | | 1.6 | 1.6 | 1.6 | 1.6 | 1.6 |
| Coupling agent (11) | 9 | 6 | 7 | 5 | 7 | 5 |
| Stearic acid (12) | 2 | 2 | 2 | 2 | 2 | 2 |
| Zinc oxide (13) | 3 | 1 | 1 | 1 | 1 | 1 |
| 20915956DPG (14) | 2 | 1.5 | 1.8 | 1.2 | 1.5 | 1.2 |
| CBS (15) | 2 | 2 | 2 | 2 | 2 | |
| Sulfur | 1 | 1 | 1 | 1 | 1 | 1.6 |
| TBzTD (16) | | | | | | 2 |

(1) SBR −27% styrene; 5% 1,2-butadiene; 15% 1,4-cis; 80% 1,4-trans; Tg −48° C.;
(2) Copolymer of ethylene and of a non-functional 1,3-butadiene (EBR);
(3) Copolymer of ethylene and of a functional 1,3-butadiene (EBR-F);
(4) N234 according to Standard ASTM D-1765;
(5) Zeosil 1165 MP, from Solvay-Rhodia, in the form of microbeads;
(6) Flexon 630 TDAE oil from Shell;
(7) Escorez 2173 resin from Exxon;
(8) MES/HPD (Catenex SNR from Shell);
(9) Escorez 5600 C9/Dicyclopentadiene hydrocarbon-based resin from Exxon (Tg=55° C.);
(10) N-1,3-dimethylbutyl-N-phenyl-para-phenylenediamine (Santoflex 6-PPD from Flexsys);
(11) TESPT (Si69 from Evonik);
(12) Pristerene 4931 stearin from Uniqema;
(13) Zinc oxide, industrial grade from Umicore;
(14) Diphenylguanidine;

(15) N-Cyclohexyl-2-benzothiazolesulfenamide (Santocure CBS from Flexsys);

(16) Tetrabenzylthiuram disulfide (Perkacit TBzTD from Flexsys).

Table 2 below shows the values of the ratio between the filler content and the plasticizing system content.

TABLE 2

| Composition | T1 | M1 | M2 | M3 | M4 | M5 |
| --- | --- | --- | --- | --- | --- | --- |
| Filler/plasticizing system content ratio | 1.6 | 1.1 | 1.6 | 1.9 | 2 | 1.4 |

Table 3 below shows the stiffness characteristics of the six mixtures presented.

TABLE 3

| Composition | T1 | M1 | M2 | M3 | M4 | M5 |
| --- | --- | --- | --- | --- | --- | --- |
| G* modulus at 60° C. (MPa) | 0.9 | 1.2 | 1.7 | 1.7 | 2.3 | 1.3 |
| G* modulus at 60° C. (base 100) | 100 | 130 | 193 | 193 | 261 | 148 |

Table 1 above describes a rubber composition T1 presented in document WO 2016/202702, used as a mixture of the second tread layer, and also five compositions in accordance with the invention for mixtures capable of constituting a first tread layer.

The rubber composition T1 comprises 100 phr of SBR and has a dynamic shear modulus of 0.9 MPa, which makes this composition suitable for providing the tyre with excellent grip due in particular to a high contact area on rough ground.

The first four compositions C1 to C4 in accordance with the invention for the first tread layer comprise 100 phr of the EBR diene elastomer as described above and composition C5 comprises 100 phr of the EBR-F diene elastomer as described above.

These five compositions have a dynamic shear modulus of between 1.2 and 2.3 MPa, which makes them suitable for stiffening the tread and thus improving the roadholding of the tyre, while allowing their use in contact with a ground on which it is running when the tread is worn.

It should be noted that the filler content/plasticizing system content ratio varies between 1.1 and 2 (Table 2).

Finally, the filler contents of these compositions are much lower than those of composition T1, which allows a significant reduction in their hysteresis.

The invention claimed is:

1. A tire having an axis of rotation and comprising a crown extended by two sidewalls and two beads, a carcass reinforcement anchored in the two beads, a crown reinforcement radially outside the carcass reinforcement, and a rubber tread radially outside the crown reinforcement, the rubber tread comprising a first radially inner layer C1, and a second radially outer layer C2, and a circumferential groove including a wear indicator, the second layer C2 being configured to be in contact with a ground on which it is running, in new or worn condition, and the first layer C1 having a radially outermost height greater than that of the wear indicator and being configured to be in contact with the ground on which it is running, in worn condition until a radially outer surface against the ground on which it is running is at a level of the wear indicator, wherein the tread comprises ribs separated by the circumferential groove with a bottom, a limit of use of the tire being defined by a minimum radial height h of the ribs relative to the bottom of the circumferential groove, VC1 and VC2 being volumes of materials C1 and C2 located in the tread at a radial height greater than a minimum radial height h, and a VC1/VC2 ratio being greater than 15%, wherein the rubber composition of the first layer C1 comprises more than 50 phr of a copolymer of ethylene and of a 1,3-diene, a reinforcing filler and a plasticizing system, the 1,3-diene being 1,3-butadiene or isoprene and ethylene units in the copolymer representing more than 50 mol % of all the monomer units of the copolymer, and wherein the copolymer of ethylene and of a 1,3-diene bears at the chain end a functional group F1 which is a silanol or alkoxysilane function.

2. The tire according to claim 1, wherein the 1,3-diene is 1,3-butadiene.

3. The tire according to claim 1, wherein the copolymer contains units of formula (I) or units of formula (II) or units of formula (I) and of formula (II)

(I)

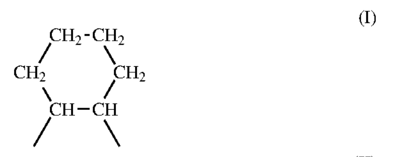

(II)

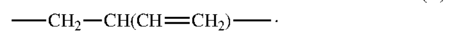

4. The tire according to claim 3, wherein molar percentages of the units of formula (I) and of the units of formula (II) in the copolymer, respectively o and p, satisfy the following equation 1, o and p being calculated on a basis of all the monomer units of the copolymer $$0 < o + p \leq 25. \quad \text{(eq. 1)}$$

5. The tire according to claim 1, wherein the reinforcing filler of the rubber composition of layer C1 comprises from 35 to 100 phr of a reinforcing filler which comprises a silica.

6. The tire according to claim 1, wherein the plasticizing system of the rubber composition of layer C1 comprises a hydrocarbon-based plasticizing resin and a hydrocarbon-based liquid plasticizing agent, a total content of hydrocarbon-based plasticizing resin and of hydrocarbon-based liquid plasticizing agent being greater than 10 phr and less than or equal to 80 phr.

7. The tire according to claim 6, wherein the hydrocarbon-based plasticizing resin has a glass transition temperature of greater than 20° C.

8. The tire according to claim 1, wherein a weight ratio between the content of reinforcing filler and a content of the plasticizing system is greater than or equal to 1.1.

9. The tire according to claim 1, wherein the copolymer of ethylene and of a 1,3-diene is the only elastomer of the rubber composition of the first layer C1.

10. The tire according to claim 1, wherein the rubber composition of the first layer C1 comprises a second elastomer.

11. The tire according to claim 1, wherein the rubber composition of the second layer C2 comprises less than 50 phr of a copolymer of ethylene and of a 1,3-diene.

12. The tire according to claim 1, wherein a dynamic shear modulus of the rubber composition of the first layer C1 is between 1 and 2.5 MPa, the dynamic shear modulus being measured at 60° C. during a temperature sweep at an imposed stress of 0.7 MPa and at a frequency of 10 Hz.

13. The tire according to claim 1, wherein a ratio K between a dynamic shear modulus of the rubber composition of the first layer C1 and a dynamic shear modulus of the rubber composition of the second layer C2 is greater than 1.1, the dynamic shear moduli being measured at 60° C. during a temperature sweep at an imposed stress of 0.7 MPa and at a frequency of 10 Hz.

* * * * *